United States Patent [19]
Anthon

[11] Patent Number: 6,057,925
[45] Date of Patent: May 2, 2000

[54] COMPACT SPECTROMETER DEVICE

[75] Inventor: Erik W. Anthon, Santa Rosa, Calif.

[73] Assignee: Optical Coating Laboratory, Inc., Santa Rosa, Calif.

[21] Appl. No.: 09/143,482

[22] Filed: Aug. 28, 1998

[51] Int. Cl.[7] .................................................. G01N 21/25
[52] U.S. Cl. ............................................................. 356/419
[58] Field of Search .................................... 356/416–419, 356/326, 328, 402–411; 250/226; 359/588–589

[56] References Cited

U.S. PATENT DOCUMENTS

| | | |
|---|---|---|
| 4,054,389 | 10/1977 | Owen . |
| 4,318,123 | 3/1982 | Knop . |
| 5,017,798 | 5/1991 | Murakami et al. . |
| 5,166,755 | 11/1992 | Gat . |
| 5,218,473 | 6/1993 | Seddon et al. . |
| 5,604,594 | 2/1997 | Juffinger . |
| 5,872,655 | 2/1999 | Seddon et al. . |

OTHER PUBLICATIONS

Seddon et al., Linear Variable Filters Match Photodiode Arrays, Laser Focus World, Technology Guide: Optical Coatings and Filters, Sep. 1991.

*Primary Examiner*—K. P. Hantis
*Attorney, Agent, or Firm*—Workman, Nydegger & Seeley

[57] ABSTRACT

A color measuring sensor assembly includes an optical filter such as a linear variable filter, and an optical detector array positioned directly opposite from the optical filter a predetermined distance. A plurality of lenses, such as gradient index rods or microlens arrays, are disposed between the optical filter and the detector array such that light beams propagating through the lenses from the optical filter to the detector array project an upright, noninverted image of the optical filter onto a photosensitive surface of the detector array. The color measuring sensor assembly can be incorporated with other standard components into a spectrometer device such as a portable calorimeter having a compact and rugged construction suitable for use in the field.

32 Claims, 3 Drawing Sheets

COMPACT SPECTROMETER DEVICE

BACKGROUND OF THE INVENTION

1. The Field of the Invention

The present invention is related to optical devices for measuring light. In particular, the present invention is related to a compact spectrometer device for use in color discrimination or evaluation.

2. The Relevant Technology

Optical devices known generally as spectrometers have been developed for measuring and analyzing the spectral or color content of electromagnetic radiation in the frequency range or spectrum of optical wavelengths. These include from ultraviolet, through visible, to near-infrared wavelengths, which include the portion of the electromagnetic spectrum producing photoelectric effects, referred to herein as "light." Various kinds of opto-electronic devices are used for both imaging applications, as by inspecting the spectral reflectance characteristics of a two-dimensional object, and for non-imaging applications.

Spectrometric measurements of light are performed in basically two ways, including dispersion-based techniques and filter-based techniques. In the dispersion-based approach, a radiation dispersion device such as a prism or diffraction grating is used to separate the incident polychromatic light into its spectral contents. The spectrally separated light is then projected onto a photodetector to measure the relative intensity in each spectral range. While dispersion-based devices can be effectively used in some applications, they have the disadvantage of being easily knocked out of alignment during use, and thus not suitable for more rigorous applications in the field.

In the filter-based approach to spectral measurement, various types of optical filters are used in conjunction with photodetectors to measure and analyze light. For example, in one approach, a single band-pass filter is placed over a detector to measure a single spectral band of the incident light. In another variation of the filter-based technique, a filter wheel on which several filters are mounted is used in conjunction with a single photodetector or several photodetectors. Alternatively, the discrete filters in the filter wheel can be replaced with a continuous circular variable filter (CVF) which is placed over a detector. Further, the CVF may be placed over several detectors to provide simultaneous spectra in a limited number of bands. These filter-based techniques are limited for practical reasons to use in low resolution spectral measurements of a few bands of light and to non-contiguous bands only.

Other spectrometer devices have been developed that utilize linear variable filters in an attempt to enhance light measuring capabilities. For example, U.S. Pat. No. 5,166,755 to Gat discloses a spectrometer apparatus including a spectrum resolving sensor containing an opto-electronic monolithic array of photosensitive elements which form a photodetector, and a continuous variable optical filter such as a linear variable filter (LVF) that is placed in an overlaying relationship with the photodetector. The LVF and photodetector are mounted in a single housing which serves to support at least the filter and the array in a unitary sensor assembly. The LVF is formed by depositing optical coatings directly onto the photodetector array, or a preformed LVF may be positioned in contact with or slightly above the array.

In U.S. Pat. No. 5,218,473 to Seddon et al., a leakage-corrected linear variable filter is disclosed. This patent describes a conventional linear variable filter system as including an LVF positioned in a spaced apart relationship with a linear detector such as a charge coupled device array. The LVF is paired with a linear detector having comparable dimensions in order to form a detector capable of receiving and discriminating a number of wavelengths of radiation simultaneously.

The use of linear variable filters in spectrometer devices has been limited because of fundamental packaging problems. Depositing an optical coating on the surface of a detector to form an LVF is problematic because of the delicate surface and wiring of the detector array. The placement of a preformed LVF on the surface of the detector array requires the removal of a cover glass that protects the delicate surface of the detector array. Such placement of an LVF during manufacture can damage the surface of the detector array.

Further, the LVF is prone to have diffuse leaks that downgrade its spectral performance and which are unavoidable when the LVF is placed in contact with the detector array surface. The LVF filter works properly only within a limited cone angle of light (numeric aperture). Light outside this limited angle may contain diffuse leaks. The detector array is capable of receiving light within the full hemisphere and will detect the diffuse leaks when placed in contact with or very close to the LVF. In addition, if the LVF is spaced apart from the surface of the detector array, then the LVF will not perform properly since light emitted from one position of the LVF may reach more than one element of the detector array, thereby limiting the spectra resolving power of the LVF.

Accordingly, there is a need for an optical/detector device that overcomes or avoids the above problems and limitations.

SUMMARY AND OBJECTS OF THE INVENTION

It is a primary object of the present invention to provide a color measuring sensor assembly that can be used in a compact spectrometer device such as a calorimeter having a rugged construction.

It is another object of the present invention to provide a color measuring sensor assembly that can be made from existing components in order to ease manufacture and reduce cost.

A further object of the present invention is to provide a color measuring sensor assembly than can be employed in a variety of applications for use in color discrimination or evaluation.

To achieve the foregoing objects, and in accordance with the invention as embodied and broadly described herein, a color measuring sensor assembly is provided for use in manufacturing a spectrometer device such as a compact, portable colorimeter. The sensor assembly includes a linear variable filter for selectively transmitting light in a predetermined is range of wavelengths along the length thereof, and a linear detector array having a photosensitive surface positioned directly opposite from the linear variable filter a predetermined distance. A plurality of lenses, such as gradient index rods or microlens arrays, are disposed between the linear variable filter and the detector array in at least one row, such that a light beam propagating through the lenses from the linear variable filter to the detector array projects an upright, noninverted image of the linear variable filter onto the photosensitive surface of the detector array.

The sensor assembly of the invention can be used to form a compact spectrometer device such as a portable calorimeter by operatively connecting the sensor assembly to various electronic and mechanical components, such as an illumination source, a detector circuit module, a signal processing module, and an output module. Such a spectrometer device can be employed in a variety of applications for color discrimination or spectral evaluation, including color matching or identification of various products. processing controls, medical diagnostics, printer calibration, agricultural applications, combustion monitoring, environmental monitoring, and in other areas requiring color measurement and spectral analysis.

These and other features and advantages of the invention will be better understood by reference to the detailed description, or will be appreciated by the practice of the invention.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings in which.

DESCRIPTION OF THE INVENTION

Figure 1:
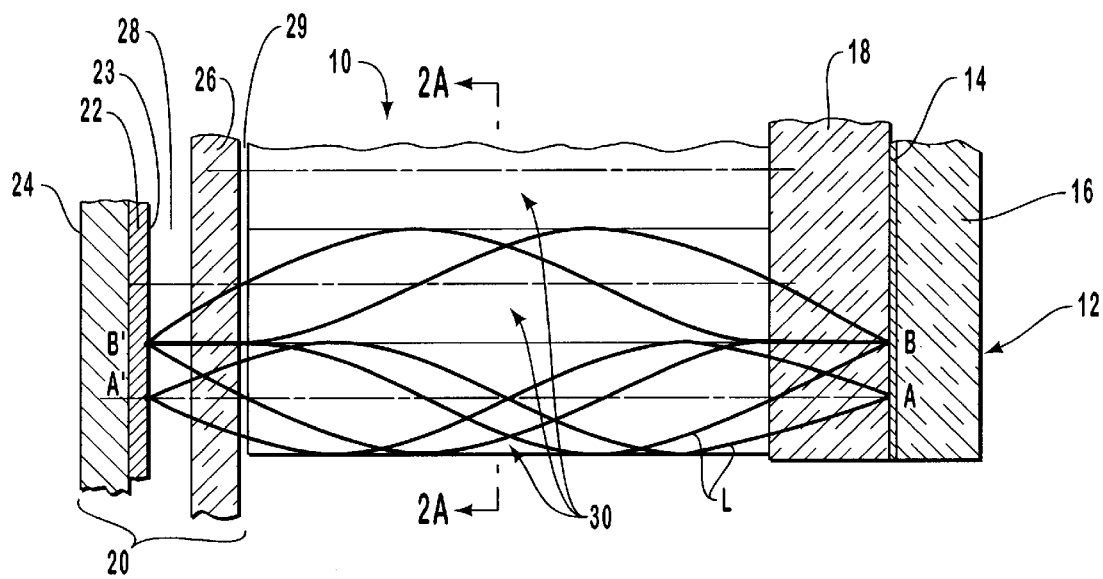
FIG. 1 is a schematic depiction of a color measuring sensor assembly according to one embodiment of the present invention.

The present invention is directed to a color measuring sensor assembly that can be employed in a spectrometer device such as a calorimeter that is compact and rugged. The sensor assembly generally includes an optical filter, an optical detector array, and a plurality of lenses disposed in at least one row between the optical filter and the optical detector. During operation of the sensor assembly, light beams propagating through the lenses, from the optical filter to the detector, project an upright, noninverted image of the optical filter onto the photosensitive surface of the detector. Various aspects of the sensor assembly of the invention will be discussed as follows.

Referring to the drawings, wherein like structures are provided with like reference designations, the drawings only show the structures necessary to understand the present invention. Additional structures known in the art have not been included to maintain the clarity of the drawings.

FIG. 1 is a schematic depiction of a color measuring sensor assembly 10 according to one embodiment of the present invention. The sensor assembly 10 generally includes a filter means for selectively transmitting light in a linearly variable manner such as an optical filter 12, a detector means for measuring the spectral characteristics of the light transmitted through the filter means such as an optical detector array 20, and a plurality of lenses 30 such as gradient index (GRIN) lenses or rods. The detector array 20 is positioned directly opposite from optical filter 12 a predetermined distance, with lenses 30 disposed between optical filter 12 and detector array 20 in at least one row. Each of the above elements of sensor assembly 10 will be discussed in further detail below.

The optical filter 12 includes a thin coating or film 14 and a transparent substrate 16 that supports film 14. Preferably, optical filter 12 is a linear variable filter (LVF) which is constructed to selectively transmit light in a linearly variable manner along the length thereof. The thin film 14 is designed to provide the variable bandpass characteristic to optical filter 12. The LVF is an interference filter that is manufactured in such a manner that there is a controlled, non-uniformity of layer thickness from one end of the filter to the other. The thickness of the layers in the LVF is controlled during manufacture so as to create a filter with differing center wavelengths across the length thereof. This results in light being separated into its spectral colors along the length of the filter, e.g., from red light at one end to blue light at the other.

The substrate 16 of the LVF is preferably formed to have a relatively rectangular shape and is made of a material which is selected on the basis of the desired range of wavelengths in which the filter operates. Suitable materials for substrate 16 include fused silica, glass, and the like. The substrate 16 is covered with film 14 in such a manner as to form a variable thickness coating having a substantially wedge-shaped profile across the length of the long dimension of the substrate. The film 14 of the LVF is normally made of stacked layers of all dielectric materials using hard, durable oxides, but may also be made of stacked layers of metal/dielectric materials such as silver and low index dielectrics.

As shown in FIG. 1, a transparent spacer 18, which is preferably made of glass, can be placed over film 14 of filter 12 in order to protect film 14 and to space the LVF and the GRIN lenses. Alternatively, an air space may be substituted for glass spacer 18.

The optical detector array 20 is employed to measure the spectral characteristics of the light transmitted through optical filter 12. The detector array 20 includes an image chip 22 such as a photodiode array that is supported on a substrate 24 made of a semiconductor material. The image chip 22 has a photosensitive surface positioned directly opposite from optical filter 20 a predetermined distance. The photodiode array of image chip 22 is formed of a series of silicon detectors with sensor sites or pixels that can be addressed individually. A transparent cover 26 is typically positioned a short distance from image chip 22 so that a gap 28 is formed between image chip 22 and cover 26.

The optical detector array 20 can be selected from a variety of linear detector array devices that are commercially available, including parallel output type devices or various charge storage or transfer devices which are customarily referred to as charge coupled devices (CCD), charge injection devices (CID), charge coupled photo diode arrays (CCPD), and the like. These devices include a monolithic or hybrid integrated circuit which contains the electronics for sequential scanning and reading the signal of each pixel in the detector array, and are manufactured utilizing large scale integration (LSI) technology.

Figure 2A:
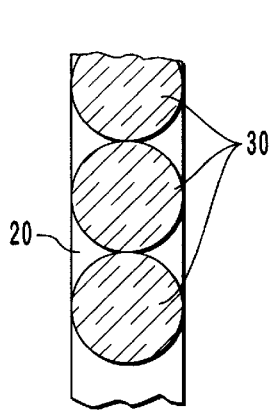
FIG. 2A is a cross-sectional end view of the color measuring sensor assembly shown in FIG. 1 taken along line 2A—2A.
Figure 2B:
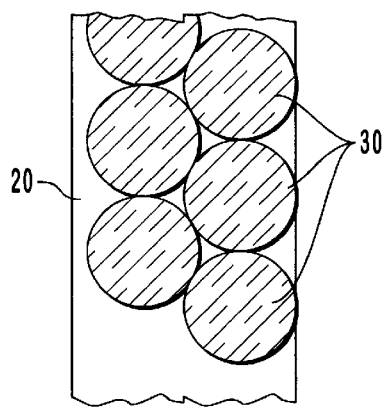
FIG. 2B is a cross-sectional end view of a color measuring sensor assembly according to an alternate embodiment of the present invention.

As shown in FIG. 1, lenses 30 are disposed between optical filter 12 and optical detector array 20 such that one end of each of the lenses abuts against spacer 18 and the other end is adjacent to an air gap 29. The lenses 30 are preferably GRIN lenses or rods that are aligned substantially parallel to each other in one or more rows, depending on the dimensions of optical filter 12 and detector array 20. For example, FIG. 2A depicts a cross-sectional end view of sensor assembly 10 with one row of GRIN lenses. FIG. 2B depicts a cross-sectional end view of an alternative embodiment of the sensor assembly with two rows of GRIN lenses. The lenses 30 are positioned in one or more rows with a selected number of GRIN rods which correspond with the dimensions of optical filter 12 and detector array 20 so that the ends of the GRIN rods cover a substantial amount of the surface area of optical filter 12 and detector array 20 which face the GRIN rods.

The lenses 30 are configured with respect to optical filter 12 and detector array 20 such that light beams propagating through lenses 30 from optical filter 12 to detector array 20 project an upright, noninverted image of optical filter 12 onto photosensitive surface 23 of detector array 20. For example, as depicted in FIG. 1, the light beams L propagate from focal points A and B on optical filter 12 through lenses 30 to form an upright, noninverted image of optical filter 12 at focal points A' and B' on photosensitive surface 23. embodiment, the GRIN rods are about 0.75 pitch between optical filter 12 and detector array 20.

In order to manufacture the sensor assembly of the present invention, an appropriate number of GRIN rods are selected and placed between an optical filter such as an LVF and a detector array such as a CCD. The GRIN rods are aligned in at least one row between the LVF and the detector array such that the optical axis of each of the GRIN rods is substantially perpendicular to the photosensitive surface of the detector array. The GRIN rods can be affixed to each other by an opaque adhesive. The number of GRIN rods used in a row is selected to conform with the size of the LVF and the image chip utilized in the sensor assembly.

Figure 3:
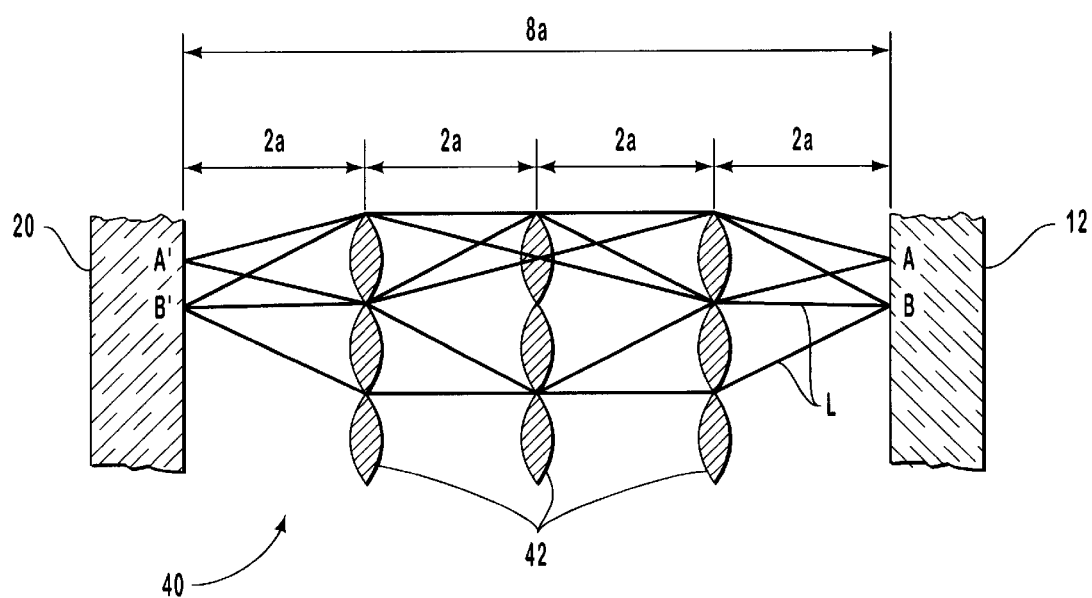
FIG. 3 is a schematic depiction of a color measuring sensor assembly according to another embodiment of the present invention.

FIG. 3 is a schematic depiction of a color measuring sensor assembly 40 according to another embodiment of the present invention. The sensor assembly 40 generally includes a filter means such as an optical filter 12, a detector means such as an optical detector array 20, and a plurality of microlenses 42. The detector array 20 is positioned directly opposite from optical filter 12 a predetermined distance, with microlenses 42 disposed between optical filter 12 and detector array 20 in a plurality of arrays. Each of the above elements of sensor assembly 40 will be discussed in further detail below.

The optical filter 12 is preferably an LVF which is constructed to selectively transmit light in a linearly variable manner along the length thereof. The LVF used in sensor assembly 40 has the same features as discussed above for the LVF used in sensor assembly 10. The detector array 20 is employed to measure the spectral characteristics of the light transmitted through optical filter 12. The detector used in sensor assembly 40 has the same features as described above for the detector of sensor assembly 10.

The microlenses 42 are disposed between optical filter 12 and detector array 20 in three microlens arrays that are aligned substantially parallel to each other as shown in FIG. 3. Each microlens has a focal length a and a diameter D, and is constructed such that D=a. Alternatively, each microlens can be constructed such that D=0.5a. Preferably, the microlenses are formed of a transparent material having an index of refraction of about 1.5. Each of the microlens arrays can be formed as a single one-dimensional row of microlenses or as multiple two-dimensional rows of microlenses, depending on the dimensions of optical filter 12 and detector array 20.

As depicted in FIG. 3, the microlens arrays can be positioned between optical filter 12 and detector array 20 such that each array is spaced a distance of 2a from an adjacent array or from the surfaces of optical filter 12 and detector array 20. Thus, the distance between focal points A and B on the surface of optical filter 12 and focal points A' and B' on the surface of detector array 20 is 8a. This configuration of the microlens arrays in sensor assembly 40 enables light beams L propagating through microlenses 42 from focal points A and B on optical filter 12 to project an upright, noninverted image of optical filter 12 at focal points A' and B' on a photosensitive surface of detector array 20.

Once formed, the sensor assembly of the invention can be provided to instrument manufacturers as a separate part for use in a variety of color analyzing photometric instruments. The sensor assembly can also be directly incorporated into a spectrometer device such as a calorimeter during a single manufacturing process. For example, the sensor assembly can be incorporated with other standard components into a portable, compact colorimeter such as a hand-held device for color measurement.

In general, the calorimeter according to the present invention has four major subsystems or modules. These include an optical module which includes the sensor assembly discussed above, a detector circuit module a signal processing module, and an output module. Each of these modular components will be discussed in further detail below.

Figure 4:
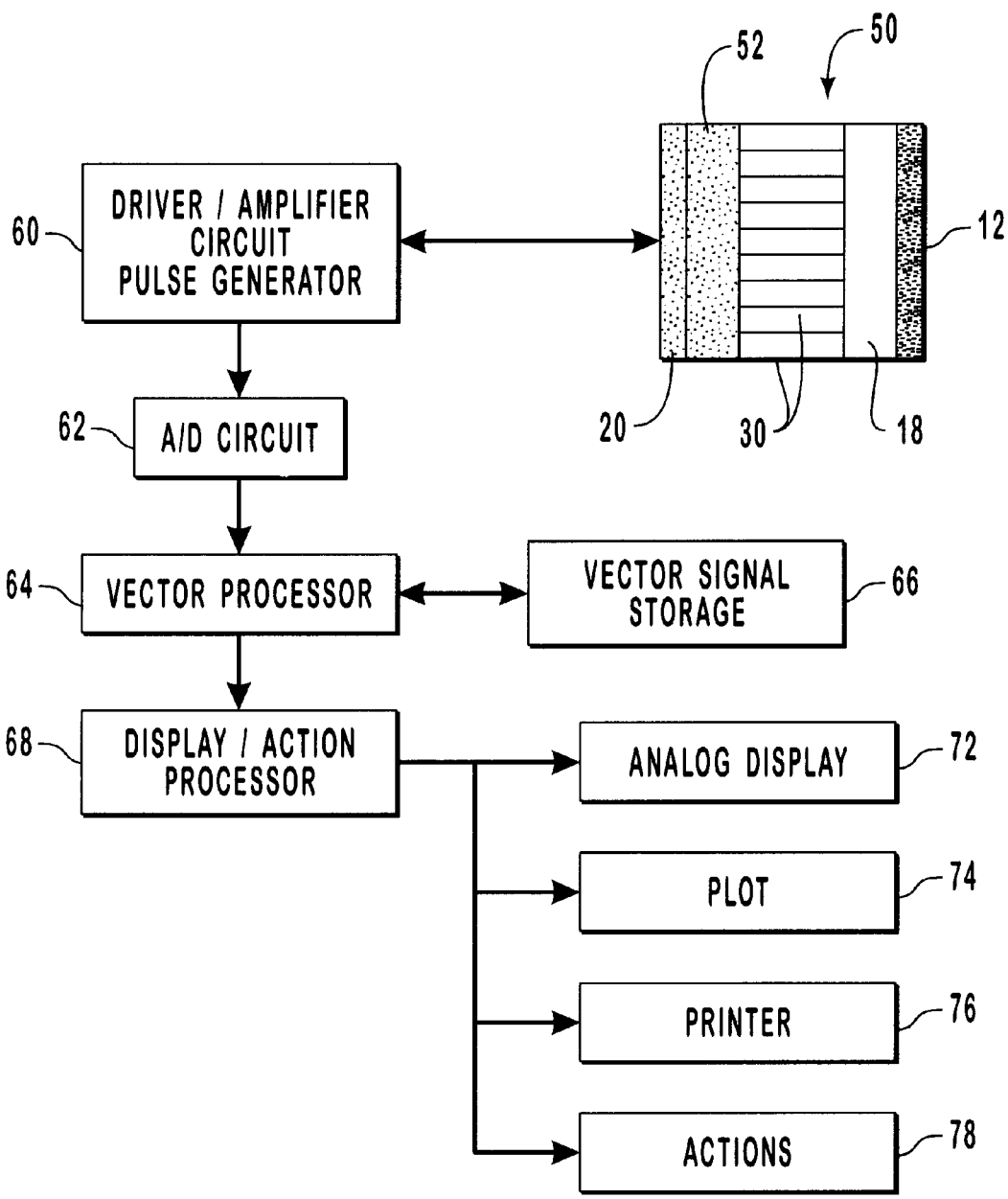
FIG. 4 is a schematic block diagram of a compact colorimeter according to the present invention.

A schematic block diagram for one embodiment of a spectrometer device such as a compact calorimeter according to the present invention is shown in FIG. 4. The optical module includes a sensor assembly 50 that forms an electro-optical head for the calorimeter. The sensor assembly 50 has similar components as sensor assembly 10 discussed above, including an optical filter 12 such as an LVF, a plurality of lenses 30 such as GRIN rods, a spacer 18 between the GRIN rods and the LVF, and a detector array 20. In addition, sensor assembly 50 has a spectral compensation filter such as a light balancing filter 52 disposed between lenses 30 and detector array 20. The light balancing filter 52 is provided in order to better match the spectral sensitivity of the array (typically silicon) with the spectral distribution of the light source (typically incandescent light).

The detector circuit module for the colorimeter includes various conventional electronic detector circuit components 60 which are operatively connected with detector array 20. Such electronic components include a driver/amplifier circuit, a pulse generator or clock, a trigger, an equalizer, and the like. Preferably, these components are provided on the same semiconductor substrate ("on-chip") as the detector array using standard integrated circuit fabrication technology.

The signal processing module for the colorimeter includes conventional signal processing components such as an analog-to-digital (A/D) circuit 62 which is operatively connected to the output of detector circuit components 60 for signal digitization. The output of A/D circuit 62 is operatively connected to a digital signal processor such as a vector processor 64 used for signal array processing and manipulation. The vector processor 64 is operatively connected to a vector signal storage device 66 such as a conventional memory device for storing a signal array. The output from vector processor 64 is operatively connected to an output processor 68 for converting the signal array to an appropriate display or action signal. The signal processing module for the calorimeter is preferably provided in the form of an integrated circuit or chip.

The output module for the colorimeter can include various display or printing devices which are operatively connected to output processor 68 as depicted in FIG. 3. These can include an analog visual display 72 such as a scope device, video monitor, cathode ray tube device, or flat screen device such as a liquid crystal display (LCD) or plasma display. The flat screen devices are particularly preferred when the display is carried by the same housing as the other modules of the colorimeter such as in a hand-held device. In addition, the output module can include an analog plot device 74 such as a graph producing device, a printer 76, or various action devices 78 such as "go/no go" indicators. The output module can also include a digital display such as a table of numbers or a display of critical numbers.

The detector circuit and signal processing modules of the colorimeter provide an electronic means for reading the electrical signals generated by the detector array in order to produce an output representative of the spectral characteristics of the light to be measured. During operation of the calorimeter, a test object is illuminated by reflected or transmitted light from a light source such as an illuminator which can provide natural light or lamp light through a conventional optical system to the test object. The light from the test object is filtered by the LDF in the sensor assembly and passes through the GRIN lenses to strike the photosensitive surface of the detector array, which converts the filtered light to electrical signals. The electronic means scan or poll the signals in the individual pixels of the detector array and thereafter process and/or store the information obtained for contemporaneous or future readout or display.

A variety of standard software programs and algorithms related to colorimetry and spectroscopy techniques can be used to run the detector circuit, signal processing, and output modules of the colorimeter in order to process and manipulate the signals from the detector array. Colorimetry techniques utilize a methodology which combines the spectral reflectances of the test object with the spectral power of a standard illuminant and standardized spectral color-matching functions representing the average human observer to calculate tristimulus values X, Y, and Z defining the color of the object. The color of a light beam from the test object is quantified by calculating the tristimulus values according to standard equations. Software for implementing various colorimetry techniques can be used to quantify the color of a light beam and give the results in standard terms. For example, software can be employed that calculates the color used, measures the color, or produces color coordinates that relate to specific colors on the object being measured.

The color measuring sensor assembly of the present invention provides many advantages and benefits. The sensor assembly can be used in a spectrometer device such as a compact calorimeter having a rugged construction and a small volume that is suitable for use in the field or other environments that have a limited size or are hostile to conventional color measuring devices. The sensor assembly also has greater light sensitivity than other conventional spectrometer devices that utilize a grating.

An advantage of the sensor assembly of the invention is that it can be made from existing, commercially available components, providing for easier manufacture and reduced cost. The use of lenses for projecting the image of the LVF on the detector array greatly reduces diffuse leaks of the LVF and enhances spectral performance while preserving the resolution of the filter. This allows a spectrometer to be constructed which achieves the maximum resolution allowable by the bandwidth of the filter. The sensor assembly can be configured to selectively sample any section of the spectrum that might be chosen, such as the visible section of the spectrum having wavelengths from about 400 nm to about 700 nm.

The sensor assembly incorporated into a spectrometer device according to the present invention can be used in many different applications which require color discrimination or evaluation. The device of the invention can be utilized for general color discrimination such as in identifying objects or merchandise by color, including the color specification of raw materials and finished products in various industries. In addition, the device of the invention can be used for color matching of paints, inks, dyes, fabrics, paper, or a variety of other objects.

Further, the spectrometer device of the invention can be utilized in various medical applications such as medical diagnostics. For example, the device can be employed in the detection of changes in skin color or body fluid color which are not visible to the eye. The device can also be used in medical color evaluation such as for detecting anemia, inflammation, jaundice, etc.

The spectrometer device of the present invention can also be utilized in various agricultural applications. These include color evaluation of food products such as measuring color to determine the ripeness of fruit, or color discrimination to distinguish between foods of different colors. The device can be used to detect the need for nutrients in soil, to detect the need for water, and to detect disease in plants. The device can also be used to measure the effectiveness of soil nutrients, water, and pesticides utilized in agricultural settings.

Other miscellaneous applications for the spectrometer device of the invention include process control, such as sensing color changes in a test object or causing corrective action to be taken in a process. Further, the device can be used for interior decorating, desktop publishing applications such as color printer calibration, combustion monitoring, environmental monitoring, as well as in any other technology requiring color analysis.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A color measuring sensor assembly for a spectrometer device, comprising:

a filter means for selectively transmitting light in a linearly variable manner along a length thereof;

a detector means for measuring the spectral characteristics of the light transmitted through the filter means, the detector means having a photosensitive surface positioned directly opposite from the filter means a predetermined distance; and a plurality of lenses disposed between the filter means and the detector means such that a light beam propagating through the lenses from the filter means to the detector means projects an upright, noninverted image of the filter means onto the photosensitive surface of the detector means.

2. The sensor assembly of claim 1, wherein the filter means comprises a linear variable filter for selectively transmitting light in a predetermined range of wavelengths.

3. The sensor assembly of claim 2, wherein the linear variable filter comprises a transparent substrate and an interference film formed thereon.

4. The sensor assembly of claim 1, wherein the detector means comprises a linear detector array.

5. The sensor assembly of claim 4, wherein the linear detector array comprises a photodiode array on a semiconductor substrate.

6. The sensor assembly of claim 1, wherein the lenses comprise microlens arrays.

7. The sensor assembly of claim 1, wherein the lenses comprise gradient index lenses.

8. The sensor assembly of claim 7, wherein the gradient index lenses have a length of about 0.75 pitch.

9. The sensor assembly of claim 7, wherein the optical axis of each of the gradient index lenses is substantially perpendicular to the photosensitive surface of the detector means.

10. The sensor assembly of claim 7, further comprising a transparent spacer disposed between the filter means and the gradient index lenses.

11. The sensor assembly of claim 10, wherein the transparent spacer is composed of glass.

12. The sensor assembly of claim 1, further comprising a spectral compensation filter disposed between the lenses and the detector means.

13. A color measuring sensor assembly for a spectrometer device, comprising:
a linear variable filter or selectively transmitting light in a predetermined range of wavelengths along a length thereof;
a linear detector array having a photosensitive surface positioned directly opposite from the linear variable filter a predetermined distance; and
a plurality of gradient index lenses disposed between the linear variable filter and the linear detector array in at least one row such that a light beam propagating through the lenses from the linear variable filter to the linear detector array projects an upright, noninverted image of the linear variable filter onto the photosensitive surface of the linear detector array.

14. The sensor assembly of claim 13, wherein the linear variable filter comprises a transparent substrate and an interference film formed thereon.

15. The sensor assembly of claim 13, wherein the linear detector array comprises a photodiode array on a semiconductor substrate.

16. The sensor assembly of claim 13, wherein the gradient index lenses have a length of about 0.75 pitch.

17. The sensor assembly of claim 13, wherein the optical axis of each of the gradient index lenses is substantially perpendicular to the photosensitive surface of the linear detector array.

18. The sensor assembly of claim 13, further comprising a transparent spacer disposed between the linear variable filter and the gradient index lenses.

19. The sensor assembly of claim 13, further comprising a spectral compensation filter disposed between the gradient index lenses and the detector array.

20. A compact spectrometer device for analyzing polychromatic light, comprising:
a linear variable filter for selectively transmitting light in a predetermined range of wavelengths along a length thereof;
a linear detector array having a photosensitive surface positioned directly opposite from the linear variable filter a predetermined distance;
a plurality of gradient index lenses disposed between the linear variable filter and the linear detector array in at least one row such that a light beam propagating through the lenses from the linear variable filter to the linear detector array projects an upright, noninverted image of the linear variable filter onto the photosensitive surface of the linear detector array; and
electronic means for reading electrical signals from the detector array to provide an output representative of the spectral characteristics of the light.

21. The device of claim 20, wherein the linear variable filter comprises a transparent substrate and an interference film formed thereon.

22. The device of claim 20, wherein the linear detector array comprises a photodiode array on a semiconductor substrate.

23. The device of claim 20, wherein the optical axis of each of the gradient index lenses is substantially perpendicular to the photosensitive surface of the linear detector array.

24. The device of claim 20, further comprising a transparent spacer disposed between the linear variable filter and the lenses.

25. The device of claim 20, further comprising a spectral compensation filter disposed between the gradient index lenses and the detector array.

26. The device of claim 20, further comprising a display or printing device operatively connected to the electronic means.

27. A method of assembling an electro-optical sensor for a spectrometer device, comprising the step of:
providing a linear variable filter;
providing a linear detector array having a photosensitive surface; and
securing a plurality of lenses in at least one row between the linear variable filter and the linear detector array such that the optical axis of each of the lenses is substantially perpendicular to the photosensitive surface of the linear detector array, the linear variable filter spaced apart from the linear detector array a predetermined distance such that a light beam propagating through the lenses projects an upright, noninverted image of the linear variable filter onto photosensitive surface of the linear detector array.

28. The method of claim 27, further comprising the step of placing a transparent spacer between the linear variable filter and the lenses.

29. The method of claim 27, further comprising the step of placing a spectral compensation filter between the lenses and the linear detector array.

30. A color measuring sensor assembly for a spectrometer device, comprising:
a linear variable filter for selectively transmitting light in a predetermined range of wavelengths along a length thereof;
a linear detector array having a photosensitive surface positioned directly opposite from the linear variable filter a predetermined distance; and
three microlens arrays positioned equidistantly from each other and between the linear variable filter and the linear detector array such that a light beam propagating through the microlens arrays from the linear variable filter to the linear detector array projects an upright, noninverted image of the linear variable filter onto the photosensitive surface of the linear detector array.

31. The sensor assembly of claim 30, wherein the linear variable filter comprises a transparent substrate and an interference film formed thereon.

32. The sensor assembly of claim 30, wherein the linear detector array comprises a photodiode array on a semiconductor substrate.

* * * * *

UNITED STATES PATENT AND TRADEMARK OFFICE
CERTIFICATE OF CORRECTION

PATENT NO. : 6,057,925
DATED : May 2, 2000
INVENTOR(S) : Erik W. Anthon

It is certified that error appears in the above-identified patent and that said Letters Patent is hereby corrected as shown below:

Title page, left column,
Under References Cited insert -- 3,204,101 Brumfield --
Under References Cited insert -- 4,993,834 Carlhoff, et al. --

Column 2,
Line 40, after "as a" change "calorimeter" to -- colorimeter --
Line 56, after "termined" and before "range" delete [is]
Line 67, after "portable" change "calorim-" to -- colorim- --

Column 3,
Line 49, after "as a" change "calorimeter" to -- colorimeter --

Column 5,
Line 27, before "embodiment" insert -- The lenses 30 can be constructed from commercially available GRIN rods. In one --
Line 64, after "length" change "a" to -- --
Line 65, after "that" change "D=a" to -- D= --
Line 66, after "D=" change "0.5a" to 0.5 --

Column 6,
Line 8, after "of" change "2a" to -- 2 --
Line 12, after "is" change "8a" to -- 8 --
Line 27, after "the" change "calorimeter" to -- colorimeter --
Line 34, after "compact" change "calorimeter" to -- colorimeter --
Line 37, after "the" change "calorimeter" to -- colorimeter --

Column 7,
Line 4, after "the" change "calorimeter" to -- colorimeter --
Line 25 change "calorimeter" to -- colorimeter --
Line 55 after "compact" change "calorimeter" to -- colorimeter --

UNITED STATES PATENT AND TRADEMARK OFFICE
CERTIFICATE OF CORRECTION

PATENT NO. : 6,057,925
DATED : May 2, 2000
INVENTOR(S) : Erik W. Anthon

It is certified that error appears in the above-identified patent and that said Letters Patent is hereby corrected as shown below:

Column 9,
Line 28, after "filter" change "or" to -- for --

Signed and Sealed this

Twenty-seventh Day of November, 2001

Attest:

NICHOLAS P. GODICI
Attesting Officer  Acting Director of the United States Patent and Trademark Office